United States Patent Office 3,337,399
Patented Aug. 22, 1967

3,337,399
GELLED COLLOIDAL SILICA FUMIGANT
COMPOSITION AND METHOD OF USE
Joseph Carl Dawson, P.O. Box 5868,
Ferguson, Mo. 63135
No Drawing. Filed Apr. 1, 1963, Ser. No. 269,788
10 Claims. (Cl. 167—39)

This invention relates to fumigant compositions and methods of fumigating, and more particularly, to gelled fumigant compositions and methods for space, bulk storage, soil and spot fumigation.

Briefly, the invention is directed to a gelled fumigant composition comprising a volatile fumigant and finely divided silica. The invention also includes the method of fumigating space, bulk storage or soil by introducing a gelled fumigant composition of the invention into the area to be fumigated.

Among the several objects of the invention may be noted the provision of an improved fumigant composition adaptable to various types of fumigation; the provision of such a composition which renders more effective the use of volatile fumigants and volatile fumigant mixtures; the provision of fumigant compositions of the class described which are prepared in gelled form and afford more effective results than ungelled fumigant compositions; and the provision of improved methods of fumigation. Other objects and features will be in part apparent and in part pointed out hereinafter.

The invention accordingly comprises the products and methods hereinafter described, the scope of the invention being indicated in the following claims.

As is known, various fumigant compositions are widely used for fumigation in space, bulk storage and soil. Many of the commonly employed fumigant compositions consist of mixtures of fumigant compounds, one or more of which may be quite volatile. For example, among the fumigant compositions widely used for fumigating grain and in other fumigation applications are the mixtures described in my U.S. Patent 2,606,857, dated Aug. 12, 1952. The mixtures described therein consist of ethylene dibromide and methyl bromide, and these mixtures exhibit synergistic effect making them superior to the use of either fumigant compound alone. However, methyl bromide has a boiling point of 40° F. and evaporates quite readily at temperatures in excess of 40° F. Therefore, when such fumigant mixtures are employed in fumigating grain stored in large, round, silo-type bins, for example, by applying the fumigant mixture from the top of the bin, it has been found that the methyl bromide component tends to evaporate or volatilize enroute to the bottom of the bin. This component of the fumigant mixture is thus lost into the air with the result that good distribution of fumigant vapors throughout the grain mass to be fumigated is not achieved. Also, the evaporation and loss of the methyl bromide component interferes with or substantially eliminates the synergistic action of the fumigant mixture to such an extent that its effectiveness is greatly reduced. Similar problems have been encountered with other fumigants and fumigant mixtures containing volatile components.

Efforts have been made to retard or inhibit the volatilization of volatile liquid fumigants, but none of these has heretofore proven satisfactory. Accordingly, there remains a need for an effective means of retarding the volatilization and loss of fumigant materials until the fumigant composition being applied has been covered with the grain flowing into a bin and to effect distribution of the fumigant composition in small quantities throughout the grain mass prior to volatilization.

In accordance with the present invention, it has now been found that the above-noted difficulties experienced with volatile fumigant compositions may be substantially overcome and volatilization of volatile fumigants effectively retarded through the use of gelled fumigant compositions containing the volatile fumigant and finely divided silica as the gelling agent. I have found that finely divided silica such as colloidal silica is a superior gelling agent for this purpose, and when incorporated into the fumigant in amounts ranging from approximately 2% to approximately 10% by weight, produces a gelled fumigant composition from which the volatile fumigant or volatile component of a fumigant mixture is slowly released into the grain mass or area being fumigated. In accordance with the invention, colloidal silica may thus be employed to gell various volatile fumigants, such as, for example, commonly used volatile liquid fumigants consisting of a mixture of ethylene dibromide and methyl bromide or a mixture of carbon tetrachloride and one or more other fumigant compounds.

Colloidal silica is a finely divided or particulate silica, and is used for various purposes in the chemical arts. A form of colloidal silica which has been found satisfactory for use it the present invention is that sold under the trade designation "Cab-O-Sil" (marketed by Minerals Chemicals Division, Cabot Corporation). "Cab-O-Sil" is a pyrogenic colloidal silica prepared by the vapor phase hydrolysis of a silicon compound and has the following properties:

Silica content (moisture-free) basis, percent _ 99.9.
Free moisture (105° C.), percent _____ 1.5.
Particle size range, microns _____ 0.007–0.020.
Specific gravity _____ 2.2.
Refractive index _____ 1.46.
Bulking value, gal./lb. _____ 0.0546.
pH (4% aqueous suspension) _____ 3.6–4.2.
Color _____ White.

It will be understood that other forms of finely divided silica having similar properties may also be used in the practice of the invention.

In preparing gelled fumigant compositions in accordance with the invention, colloidal silica and a volatile fumigant or volatile fumigant mixture are introduced into a container and agitated whereupon the collodial silica and fumigant readily mix to produce a gelled fumigant composition. The gelled fumigant composition is then preferably maintained under pressure until ready for use in fumigating space, bulk storage or soil. When exposed to the atmosphere, as for example in a grain storage bin, the volatile fumigant or fumigant mixture is slowly released from the gelled fumigant composition.

While the amount of colloidal silica gelling agent necessary to form the gelled fumigant compositions of the invention varies with the particular volatile fumigant or fumigant mixture being gelled, in general between approximately 2% and approximately 10% by weight of colloidal silica should be included to form a gelled fumigant of the desired consistency. Preferably, 3–5% by weight of colloidal silica is included to produce gels having a consistency comparable to that of toothpaste.

The following examples illustrate the invention:

*Example 1*

A gelled fumigant composition was prepared as follows. Weighed amounts of a fumigant (marketed under the trade designation "Dawson 73" by Ferguson Fumigants, Inc.) and colloidal silica (a gelling agent marketed under the trade designation "Cab-O-Sil H5" by Minerals & Chemicals Division, Cabot Corporation) were introduced into a one pint glass jar. The fumigant consisted of 70% by weight of ethylene dibromide and 30% by weight of methyl bromide. The contents of the jar were agitated to produce a gelled fumigant composition having the following percentage by weight composition:

Component: Percentage by wt.
Fumigant _____ 98
Colloidal silica gelling agent _____ 2

The gelled fumigant composition was quite fluid in nature. In preparing the composition, it was observed that the fumigant and colloidal silica mixed readily and required little agitaton.

Example 2

Example 1 was repeated in preparing a gelled fumigant composition having the following percentage by weight composition:

Component: Percentage by wt.
Fumigant (marketed under the trade designation "Dawson 73") _____ 97
Colloidal silica gelling agent _____ 3

This gelled fumigant composition was of a thicker consistency than that of the Example 1 composition, and retained liquid properties to a lesser degree.

Example 3

Example 1 was repeated in preparing a gelling fumigant composition having the following percentage by weight composition:

Component: Percentage by wt.
Fumigant (marketed under the trade designation "Dawson 73") _____ 96
Colloidal silica gelling agent _____ 4

This gelled fumigant composition was still more viscous than the Example 2 composition and exhibited a consistency approximating that of toothpaste.

Example 4

Example 1 was repeated in preparing a gelled fumigant composition having the following percentage by weight composition:

Component: Percentage by wt.
Fumigant (marketed under the trade designation "Dawson 73") _____ 95
Colloidal silica gelling agent _____ 5

This gelled fumigant composition was more viscous than the compositions of Examples 1–3.

Example 5

Example 1 was repeated in preparing a gelled fumigant composition having the following percentage by weight composition:

Component: Percent by wt.
Fumigant (marketed under the trade designation "Dawson 73") _____ 94
Colloidal silica gelling agent _____ 6

This gelled fumigant composition was rather thick with the gel clamping together into large masses.

Example 6

Example 1 was repeated in preparing a gelled fumigant composition having the following percentage by weight composition:

Component: Percentage by wt.
Fumigant (marketed under the trade designation "Dawson 73") _____ 92
Colloidal silica gelling agent _____ 8

The fumigant and colloidal silica gelling agent formed a thick gel which was difficult to stir.

Example 7

Example 1 was repeated using, as the gelling agent, finely divided silica marketed under the trade designation "Si-O-Lite" by Mallinckrodt Chemical Works. This is a bulky silica of very fine particle size. A gelled fumigant composition was obtained having the following percentage by weight composition:

Component: Percentage by wt.
Fumigant (marketed under the trade designation "Dawson 73") _____ 90
Finely divided silica (marketed under the trade designation "Si-O-Lite") _____ 10

This gelled fumigant composition had a consistency comparable to that of the gelled fumigant composition of Example 3.

Example 8

Example 1 was repeated using colloidal silica as the gelling agent and a fumigant consisting of 7.2% by weight of ethylene dibromide, 29.2% by weight of ethylene dichloride and 63.6% by weight of carbon tetrachloride. A gelled fumigant composition was obtained having the following percentage by weight composition:

Component: Percentage by wt.
Fumigant _____ 96
Colloidal silica gelling agent _____ 4

This gelled fumigant composition had a consistency comparable to that of the gelled fumigant composition of Example 3.

Example 9

Example 1 was repeated using colloidal silica as the gelling agent and a fumigant consisting of 70.2% by weight of ethylene dichloride and 29.8% by weight of carbon tetrachloride. A gelled fumigant composition was obtained having the following percentage by weight composition:

Component: Percentage by wt.
Fumigant _____ 95
Colloidal silica gelling agent _____ 5

This gelled fumigant composition had a consistency comparable to that of the gelled fumigant composition of Example 3.

Example 10

Example 1 was repeated using colloidal silica as the gelling agent and a fumigant consisting of 83.5% by weight of carbon tetrachloride and 16.5% by weight of carbon bisulfide. A gelled fumigant composition was obtained having the following percentage by weight composition:

Component: Percentage by wt.
Fumigant _____ 95.5
Colloidal silica gelling agent _____ 4.5

This gelled fumigant composition had a consistency comparable to that of the gelled fumigant composition of Example 3.

Example 11

Example 1 was repeated using the colloidal silica as the gelling agent and a fumigant consisting of 76.5% by weight of carbon tetrachloride, 10.0% by weight of carbon bisulfide, 10.0% by weight of ethylene dichloride and 3.5% by weight of ethylene dibromide. A gelled fumigant composition was obtained having the following percentage by weight composition:

Component: Percentage by wt.
Fumigant _____ 95.5
Colloidal silica gelling agent _____ 4.5

This gelled fumigant composition had a consistency comparable to that of the gelled fumigant composition of Example 3.

Example 12

Example 1 was repeated using colloidal silica as the gelling agent and fumigant consisting of 78.8% by weight of carbon tetrachloride, 19.2% by weight of carbon bisulfide, 1.0% by weight of sulfur dioxide and 1.0% by weight of petroleum ether. A gelled fumigant composition was obtained having the following percentage by weight composition:

| Component: | Percentage by wt. |
|---|---|
| Fumigant | 95.5 |
| Colloidal silica gelling agent | 4.5 |

This gelled fumigant composition had a consistency comparable to that of the gelled fumigant composition of Example 3.

*Example 13*

The gelled fumigant composition of Example 2 was employed in the test work described in this and the following examples except Example 18. The gelled fumigant composition was prepared in a 50 lb. cylinder, and the cylinder was then pressurized to 110 p.s.i. with compressed air. An automatic cylinder filler was used for this purpose with only the air solenoid in operation. A switch automatically shut the air pressure off when it reached the predetermined 110 p.s.i. The cylinder was equipped with an oversized positive action valve with attached standpipe. Approximately 3 ft. of $5/16''$ O.D. polyethylene tubing was attached to the valve on the cylinder. At the end of the polyethylene tubing, a Hoke valve was installed and to this valve 3 ft. of $5/16''$ O.D. copper tubing was attached.

In this experiment and the experiments described in the following examples, grain was introduced into a vertical bin using a conventional belt and tripper. The rate of flow of the grain was determined prior to initiating fumigation for the purpose of determining at what intervals to apply the gelled fumigant composition to arrive at the desired dosage per 1,000 bu. of grain.

In preparation for the fumigation, the cylinder containing the gelled fumigant composition was placed on bathroom scales near the manhole at the top of the bin, and the copper tubing was inserted into the manhole. In applying the gelled fumigant composition, the valve on the cylinder containing the composition was opened first and then the Hoke valve was opened and the scales observed until the predetermined dosage of gelled fumigant composition was dispersed. It was observed that it took from five to seven seconds to disperse 1 lb. of gelled fumigant composition. The valve on the cylinder remained open during the entire fumigation operation and the fumigant composition was dispersed by employing the Hoke valve only. In certain of the tests described, care was exercised not to apply the gelled fumigant composition directly on the grain stream. In other tests, the gelled fumigant composition was applied directly on the grain stream. The intervals between applications of the fumigant composition were timed with a stop watch. The gelled fumigant composition was applied at 500 bushel intervals in order to distribute the fumigant composition evenly throughout the grain mass. In all but one of the fumigation operations, the first and last 1,000 bushels of grain entering the test bin were given twice the amount of fumigant composition as the remainder of the grain received.

During the fumigation operations, grain was taken from the belt using a 2½ gal. bucket. A small amount of grain from each of these buckets was placed in a smaple bag for the purpose of obtaining bromine residue and percent moisture of the grain. These samples were taken every 1,000 bushels.

Grain temperatures were obtained by using a Radson thermocouple grain temperature probe. The probe was inserted into each bucket of grain removed from the belt. These temperatures were averaged to arrive at an average prefumigation grain temperature. After completing the fumigation operation, all samples in the bags were thoroughly mixed and processed through a grain separator to obtain two composite samples. These samples were used to determine the percentage of moisture in the grain and to obtain prefumigation bromine residues of the grain.

Plastic test boxes containing as test insects five Confused Flour Beetle adults, or five Granary Weevil adults, or five Confused Flour Beetle adults plus five Granary Weevil adults, were employed in the test work. A small amount of flour was added to each test box to prevent starvation of the insects during the exposure period. Two test boxes per 1,000 bushels of grain were used. The test boxes were perforated with a small hole to aid in the entry of oxygen and fumigant composition vapors. The test boxes were placed inside cloth bags to aid in their recovery from the belts in the event the grain could not be run over a coarse separator or a scalper. Caution was exercised not to apply the test boxes and fumigant composition too close together so that the fumigant composition would come directly in contact with the test boxes.

Upon completion of each fumigation operation, the manhole cover on top of the bin was sealed with masking tape and a warning sign attached. Also, any accessible air vents to the test bin were closed, if possible.

After a predetermined exposure period, the fumigated grain was transferred from the fumigated bin to another bin. At this time, the test boxes were removed directly from the belt, or, if possible, from a coarse separator or scalper. As the test boxes were being removed, temperatures of the grain were again taken in the manner described above when obtaining the before-fumigation temperatures. Also, two composite samples for the purpose of obtaining post-fumigation grain moisture and inorganic, as well as total, bromine residues were gathered in the same manner as employed in obtaining the pre-fumigation information.

The test insects in each test box were counted immediately upon removal from the bin and again fater 24 hours. They were recorded as "live," "moribund" or "dead." "Moribund" may be defined as an affected insect, ranging from a slight twitching of the antenna or legs to more vigorous kicking. In any case, the insect is immobile. One or more control test boxes were retained from each fumigation as a check. These insects were held at room temperature during the exposure period and counted along with the other test insects recovered from the fumigated bins.

In the first test, a fumigation was carried out using 2 lbs. of the gelled fumigant composition of Example 2 per 1,000 bushels of grain. The first and last 1,000 bushels received a dosage of 4 lbs. Fumigation was conducted in a round concrete bin, 140 ft. deep x 20 ft. in diameter, with a capacity of 37,000 bushels. The grain fumigated was #2 New Crop Red Wheat, and 15,863 bushels of the wheat were introduced into the bin The wheat was weighed over a scale and emptied into the bin in 2,000 bushel drafts The temperature of the grain at the time of fumigation was 77.5° F., and the moisture content was 13.7%. The atmospheric temperature was 60° F.

33 test boxes were added to the grain as it went into the bin, and all but six of these test boxes were recovered at the end of a 14-day exposure period. The insects employed in this fumigation as test insetcs were Granary Weevil adults, with five of the insects in each test box. When the test boxes were recovered, the temperature of the grain was 77.5° F. and the moisture content was 13.85%.

The immediate count of the insects revealed no "live," 2.3% "moribund" and 97.7% "dead." There was no change from the above count after 24 hours. The control insects were all "live" in both of these counts. The pre-fumigation wheat samples contained 98.4 p.p.m. total bromine and 79.8 p.p.m. inorganic bromine. The post-fumigation samples contained 100.1 p.p.m. total bromine and 79.9 p.p.m. inorganic bromine.

Example 14

Example 13 was repeated using 3 lbs. of the gelled fumigant composition of Example 2 per 1,000 bushels. The test bin was a round concrete bin, 110 ft. deep x 12½ ft. in diameter. This bin had a capacity of 14,000 bushels of grain. The grain fumigated was 1961 Kansas #1 Hard Wheat and 13,200 bushels of this wheat were introduced into the bin. The grain temperature at the time the fumigation was conducted averaged 52° F. In this particular bin, the first and last 1,000 bushels of grain did not receive a double dosage of the fumigant composition.

27 test boxes were introduced into the bin and of these 25 were recovered after a seven-day exposure period. Each of the test boxes contained 5 confused flour beetle adults as the test insects.

Immediate count of the test insects upon expiration of the exposure period revealed no "live," 25.6% "moribund" and 74.4% "dead." The 24-hour count showed 24% "moribund" and 76% "dead." The control test box showed all of the insects to be alive in both counts. Pre-fumigation samples showed that the wheat contained 100.1 p.p.m. total bromine and 71.9 p.p.m. inorganic bromine whereas the post-fumigation samples showed 100.1 p.p.m. total bromine and 74.6 p.p.m. inorganic bromine.

Example 15

Example 13 was repeated using 3 lbs. of the gelled fumigant composition of Example 2 per 1,000 bushels. The test bin was a round concrete bin, 140 ft. x 20 ft. in diameter, with a capacity of 37,000 bushels. The grain fumigated was #3 New Crop Red Garlic Soft Wheat, and 34,200 bushels were introduced into the bin in 2,000 bushel drafts. Temperature of the wheat at the time of fumigation averaged 73° F. with a 13.6 moisture content. The first and last 1,000 bushels of wheat were given a double dosage of 6 lbs. of the gelled fumigant composition.

A total of 70 test boxes were introduced into the bin and 60 of these were recovered after an exposure period of nine days. The test boxes each contained 5 confused flour bettel adults and 5 granary weevil adults. The temperature of the wheat at the time the boxes were removed therefrom was 70.3° F. and atmospheric temperature was 45° F.

The immediate count, as well as the 24-hour count, showed 7% of the confused flour beetles and 19% of the granary weevils to be "live." 19% of the confused flour beetles and 3% of the granary weevils were "moribund." 74% of the confused flour beetles and 78% of the granary weevils were "dead." The total results were thus 13% "live," 11% "moribund" and 76% "dead." Samples of the wheat taken prior to fumigation contained 42.6 p.p.m. total bromine, and 24.1 p.p.m. inorganic bromine, whereas post-fumigation samples of the wheat showed 53.4 p.p.m. total bromine and 29.4 p.p.m. inorganic bromine.

In this particular fumigation operation, the wind velocity was rather high, creating an updraft in the bin. During the fumigation, strong fumigant vapors were noticed coming from the top of the bin from time to time.

Example 16

Example 13 was repeated using 3 lbs. of the gelled fumigant composition of Example 2 per 1,000 bushels. The grain fumigated was #1 Dark Northern Spring Wheat, and the test bin was a round concrete bin 110 ft. deep x 12½ ft. in diameter with a capacity of 14,000 bushels. 11,000 bushels of wheat were introduced into the bin. The temperature of the wheat at the time of fumigation was 63.2° F. and the moisture content was 10.98%. The first and last 1,000 bushels of wheat entering the pin were given a double dosage of 6 lbs. of the fumigant composition.

22 test boxes were introduced into the bin and of these 16 were recovered. Each test box contained 10 confused flour beetle adults. An eight-day exposure period was used. The temperature of the wheat at the time the test boxes were removed therefrom was 54.8° F. and the atmospheric temperature was 47° F.

The immediate count revealed 37.6% "live," 1.8% "moribund" and 60.7% "dead." The 24-hour count showed 30% "live," 5.6% "moribund" and 64.4% "dead." Two control boxes held at room temperature throughout the exposure period contained all "live" confused flour beetles in both counts.

Example 17

Example 13 was repeated using 4 lbs. of the gelled fumigant composition of Example 2 per 1,000 bushels. The grain fumigated was #1 Dark Hard Kansas Wheat which had been in storage for two years, and the test bin was a round concrete structure, 110 ft. deep x 12½ ft. in diameter and with a capacity of 14,000 bushels. The temperature of the wheat at the time of fumigation was 70.8° F., and the moisture content was 11.5%. The first and last 1,000 bushels of wheat entering the bin were given a double dosage of 8 lbs. of the fumigant composition.

23 test boxes were introduced into the bin, and all of these were recovered. Each test box contained 5 confused flour beetle adults, and an exposure period of 13 days was used. The temperature of the wheat at the time the test boxes were removed therefrom was 60° F., and the atmospheric temperature was 47° F.

The immediate count revealed no "live," 0.7% "moribund" and 98.3% "dead." There was no change in this count after 24 hours. Two control boxes held at room temperature throughout the exposure period contained all "live" confused flour beetles in both counts. Samples of wheat taken prior to fumigation contained 42.6 p.p.m. total bromine and 34.6 p.p.m. inorganic bromine, whereas postfumigation samples of the wheat contained 58.7 p.p.m. total bromine and 45.4 p.p.m. inorganic bromine.

Example 18

Example 13 was repeated except that the fumigant composition employed was an ungelled liquid fumigant composition marketed under the trade designation "Dawson 73" by Ferguson Fumigants, Inc. The fumigant consisted of 70% by weight of ethylene dibromide and 30% by weight of methyl bromide. The dosage applied was 3.68 lbs. per 1,000 bushels of grain, and the test bin was a round concrete bin 140 ft. deep and 20 ft. in diameter with a capacity of 37,000 bushels of grain. However, only 22,000 bushels of grain were introduced into the bin and fumigated. The grain fumigated was 1961 #2 Yellow Hard Wheat. The average temperature of the wheat at the time of fumigation was 68.3° F. and the moisture content was 13%. The first and last 1,000 bushels of wheat entering the bin were given a double dosage of fumigant composition.

44 test boxes were introduced into the bin, and 42 of these were recovered. Each test box contained 10 confused flour beetle adults as the test insects, and an exposure period of 12 days was used.

The immediate count as well as the 24-hour count showed 42.4% "live," 9.8% "moribund" and 47.8% "dead."

The grain had natural infestation of insects and when removing the test boxes, samples were sieved out to determine the effect of the fumigant composition on the natural infestation. It was found that all insects sieved from the wheat were "live."

In the foregoing tests, the temperature of the grain being fumigated ranged from 52° F. to a maximum of 77.5° F. Grain fumigation is normally carried out with the grain temperature above 70° F. (e.g., in the range between 80 and 90° F.), and it is known that at grain temperatures below 70° F., increased dosages of fumigant composition must be utilized in order to achieve effective fumigation. Accordingly, based on the foregoing test results, a higher percentage of mortality among test insects would be expected to occur with the same dosages at grain temperatures in the normal fumigation range of above 70° F.

In view of the above, it will be seen that the several objects of the invention are achieved and other advantageous results attained.

As various changes could be made in the above methods and products without departing from the scope of the invention, it is intended that all matter contained in the above description shall be interpreted as illustrative and not in a limiting sense.

What is claimed is:

1. A stable, gelled fumigant composition comprising a volatile fumigant and colloidal silica.

2. A stable, gelled fumigant composiiton comprising between approximately 90% and 98% by weight of a volatile fumigant and between approximately 2% and 10% by weight of colloidal silica.

3. A stable, gelled fumigant composition comprising approximately 96% by weight of a volatile fumigant and approximately 4% by weight of colloidal silica.

4. A stable, gelled fumigant composition comprising between approximately 90% and 98% by weight of a volatile liquid fumigant and between approximately 2% and 10% by weight of colloidal silica, said fumigant consisting essentially of approximately 70% by weight of ethylene dibromide and approximately 30% by weight of methyl bromide.

5. A stable, gelled fumigant composition comprising approximately 96% by weight of a volatile liquid fumigant and approximately 4% by weight of colloidal silica, said fumigant consisting essentially of approximately 70% by weight of ethylene dibromide and approximately 30% by weight of methyl bromide.

6. The method of fumigating which comprises introducing into an area to be fumigated, a stable, gelled fumigant composition comprising a volatile fumigant and colloidal silica.

7. The method of fumigating which comprises introducing into an area to be fumigated, a stable, gelled fumigant composition comprising between approximately 90% and 98% by weight of a volatile fumigant and between approximately 2% and 10% by weight of colloidal silica.

8. The method of fumigating which comprises introducing into an area to be fumigated, a stable, gelled fumigant composition comprising approximately 96% by weight of a volatile fumigant and approximately 4% by weight of colloidal silica.

9. The method of fumigating which comprises introducing into an area to be fumigated, a stable, gelled fumigant compositon comprising between approximately 90% and 98% by weight of a volatile liquid fumigant and between approximately 2% and 10% by weight of colloidal silica, said fumigant consisting essentially of approximately 70% by weight of ethylene dibromide and approximately 30% by weight of methyl bromide.

10. The method of fumigating which comprises introducing into an aera to be fumigated, a stable, gelled fumigant composition comprising approximately 96% by weight of a volatile liquid fumigant and approximately 4% by weight of colloidal silica, said fumigant consisting essentially of approximately 70% by weight of ethylene dibromide and approximately 30% by weight of methyl bromide.

References Cited
UNITED STATES PATENTS

| | | | |
|---|---|---|---|
| 2,425,238 | 8/1947 | Fletcher et al. | 167—39 |
| 2,547,822 | 4/1951 | Johnson et al. | 167—39 |
| 2,606,857 | 8/1952 | Dawson | 167—39 |
| 2,691,615 | 10/1954 | Turner et al. | 167—39 |
| 2,741,600 | 4/1956 | Allen | 252—317 |
| 2,980,611 | 4/1961 | Martinek et al. | 252—28 |
| 3,169,905 | 2/1965 | Lambert | 167—39 |

ALBERT T. MYERS, *Primary Examiner.*

JULIAN S. LEVITT, *Examiner.*

GEORGE A. MENTIS, *Assistant Examiner.*